Oct. 28, 1924.  
F. DOUTHITT  
1,513,379  
METHOD OF ASCERTAINING CAMERA STOPS  
Filed July 2, 1920  2 Sheets-Sheet 1

Inventor  
Fletcher Douthitt,  
By  
Attorneys

Oct. 28, 1924.

F. DOUTHITT 1,513,379

METHOD OF ASCERTAINING CAMERA STOPS

Filed July 2, 1920      2 Sheets-Sheet 2

Inventor
Fletcher Douthitt,

By

Attorneys

Patented Oct. 28, 1924.

1,513,379

UNITED STATES PATENT OFFICE.

FLETCHER DOUTHITT, OF DETROIT, MICHIGAN.

METHOD OF ASCERTAINING CAMERA STOPS.

Application filed July 2, 1920. Serial No. 393,706.

*To all whom it may concern:*

Be it known that I, FLETCHER DOUTHITT, a citizen of the United States of America, residing at Detroit, in the county of Wayne and State of Michigan, have invented certain new and useful Improvements in Methods of Ascertaining Camera Stops, of which the following is a specification, reference being had therein to the accompanying drawings.

In the photo-engraving art there is considerable uncertainty or guess work in the reproduction of copy when making half tone dot negatives, by a plurality of exposures in a camera requiring a combination of diaphragm stops and ruled screen separation, and my invention aims to provide a method of ascertaining the combination of stops and the screen separation distance with absolute accuracy in balance or proportion to a bellows extension, so that better half tone negatives may be produced.

In carrying my method into effect, it is necessary that a camera be provided with certain mechanical devices, and in order that my method may be understood, reference will now be had to the mechanical devices as illustrated in the drawings, wherein—

Figure 1:
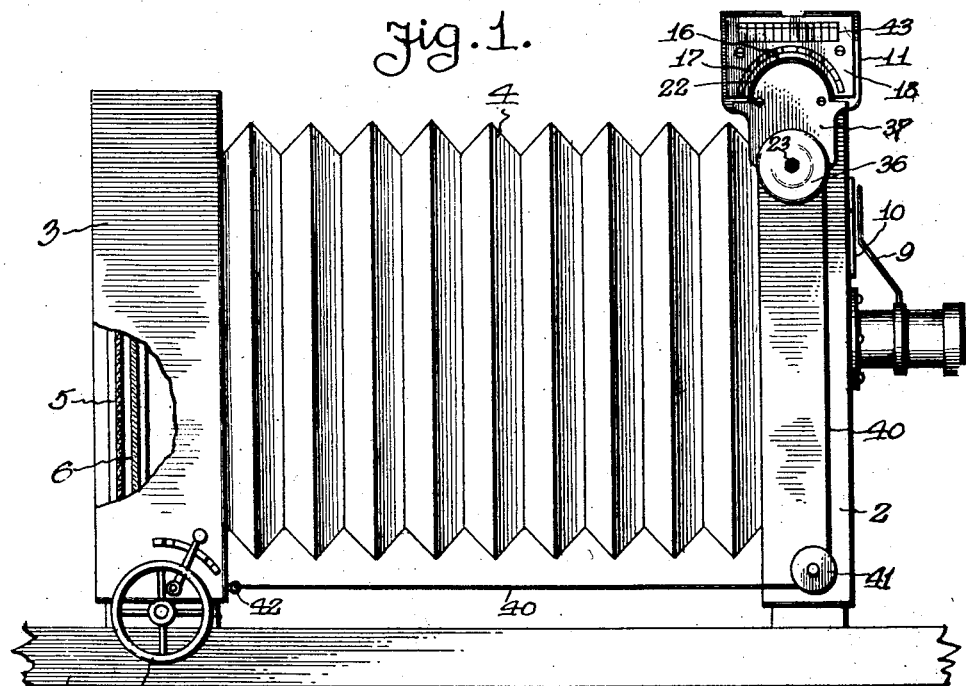
Figure 1 is a side elevation of a camera, partly broken away and partly in section, and equipped with devices in accordance with my invention.
Figure 2:
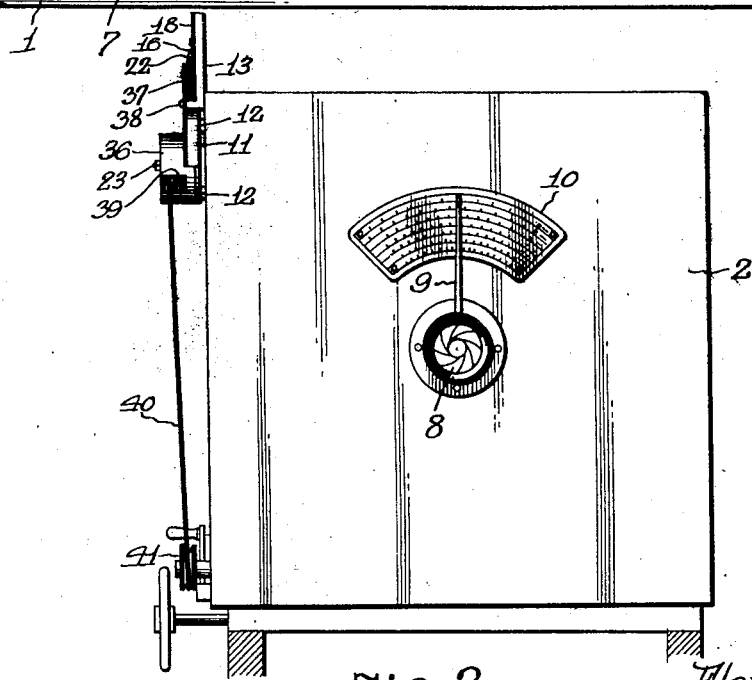
Fig. 2 is a front elevation of the camera, showing the diaphragm or shutter of the camera provided with a stop indicator.

The reference numeral 1 denotes a camera bed for a camera having a front section 2 and a rear section 3, these sections being connected by the usual bellows 4.

5 denotes a sensitized plate behind a screen 6 and said screen is of the usual kind made by ruling two pieces of glass with lines and connecting the pieces of glass together, so that the lines of one piece of glass are at a right angle to the line of the other piece of glass. The opaque lines are spaced so that the interstices or transparent spaces between the lines will be the same width as the opaque lines. As in the art, the screen may be anywhere from sixty to two hundred lines so that an operator, familiar with the work to be produced, may select a proper screen.

7 denotes a conventional form of mechanism for adjusting the screen 6 relative to the sensitized plate 5, and the space between the screen and the sensitized plate will be hereinafter termed the "screen distance" or "separation," which is varied for different dot formations, such separation being controlled by the laws of geometrical projection, and in this instance, regulated by the bellows extension of the camera.

8 denotes the diaphragm of the lens of the camera, and the diaphragm has a hand 9 projecting upwardly in front of a scale or indicia plate 10 suitably secured to the front section 2 of the camera. On the indicia plate are placed seven series of graduations $F^{16}$, $F^{19}$, $F^{22}$, $F^{27}$, $F^{32}$, $F^{39}$, and $F^{45}$, said series of graduations being for the necessary diaphragm openings when making a half tone negative, and these graduations may be indefinitely carried out so as to enable an operator to secure better control of delicate tone values having an intermediate line or intermediate set of stops. The diaphragm stops are generally known as:—

The detail stop which gives tones between the dark tones and the medium tone; the pick-up stop which gives the detail in the tone of the copy between medium tones and the white tones; high light stops which transfer the white parts of the copy to the plate 5 and secure the general outline of the copy to be reproduced; flashing stops, and colored detail stops.

To graduate the plate 10 for the first or detail stop and bearing in mind that no two diaphragm openings are exactly alike, I use a series of perfectly true plugs or rods of known diameter and by trying said rods in a diaphragm opening, I learn the exact size of the same. Supposing the size of the diaphragm opening is $\frac{50}{1000}$, I then lay off the series of consecutively numbered graduations $F^{32}$, each of which is $\frac{50}{1000}$ and each of which may be sub-divided, for instance, into two subdivisions or as many depending on the minuteness of adjustment desired. From these graduations are determined the graduations of the other series as will hereinafter appear.

11 denotes a plate having apertured bosses 12 and flanges 13 and this plate is adapted to be secured, by screws or other fastening means, to the front section 2 of the camera at an upper side edge thereof as shown in Fig. 1. The bosses 12 receive the fastening means and cooperate with the flanges 13 in maintaining the plate 11 in spaced relation to the side wall of the front section.

14 denotes a stud centrally of the plate 11 and rotatable on said stud is a gear wheel 15 having its rear face provided with a finger 16 movable in front of a scale 17 on a detachable and interchangeable card 18 arranged against the plate 11. The card is substantially rectangular in elevation and has its upper edge exposed at a finger slot 19 in the upper edge of the plate 11, while the lower edge of the card is recessed, as at 20, to provide clearance for the stud 14 and its bearing. The card 18 is retained in place by studs 21 entering openings adjacent the side edges of said card, and in addition to these studs there is an inverted U-shaped spring or retaining member 22 supported from the plate 11 and engaging the front face of the card 18, as best shown in Fig. 3.

Centrally of the lower portion of the plate 11 is an adjustable tie rod 23 and mounted on said tie rod, against the plate 11 is a bearing 24 and a disk 25, said bearing and disk being held in place by a jamb nut 26 on the tie rod. Rotatable on the bearing 24 is the toothed hub 27 of a drum 28 having a large outer helically grooved rim 29 and a small inner rim 30, said rim cooperating with the disk 25 in providing an enclosure for a spiral band spring 31 which has one end thereof anchored, as at 32 in the rim 30 and the opposite end thereof anchored in the bearing 24, as at 33.

Meshing with the toothed hub 27 of the drum 28 is a small compound gear 34 rotatable on a stud 35 carried by the plate 11 and this compound gear meshes with the large gear 15, so that when the drum 28 is revolved movement will be imparted to the finger 16.

Figures 3, 4, 5:
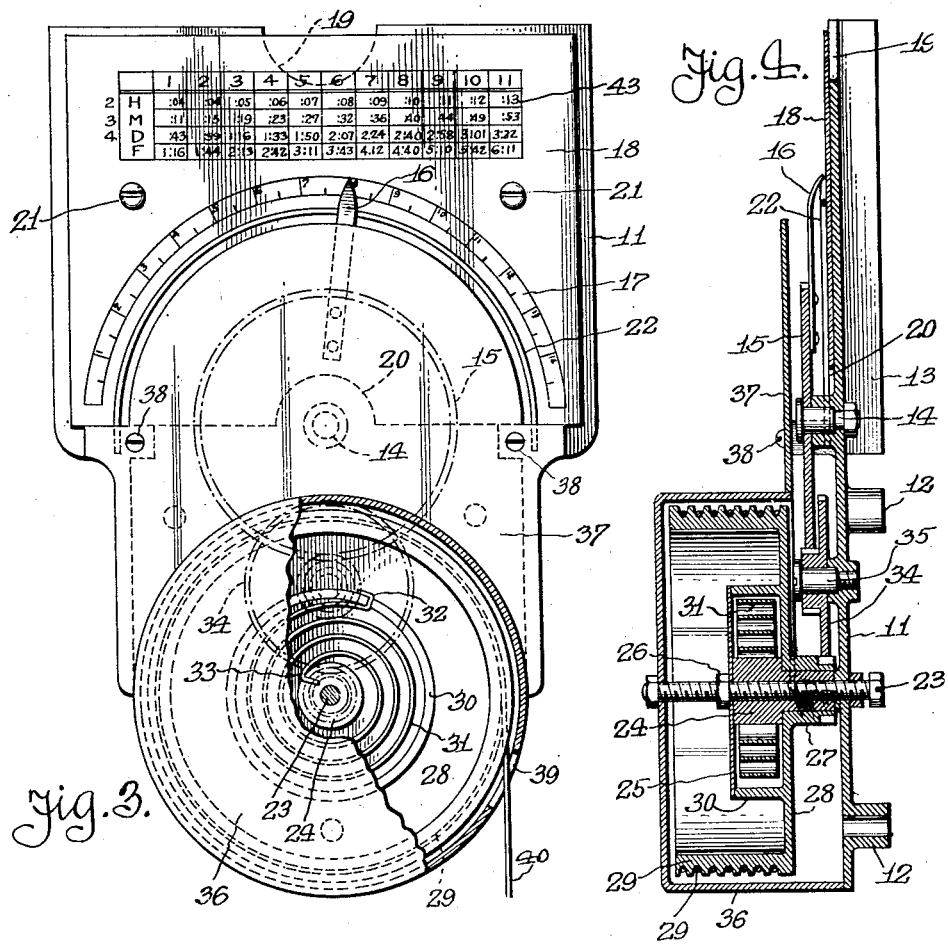
Fig. 3 is an enlarged side elevation of one of the devices, partly broken away and partly in section.
Fig. 4 is a vertical sectional view of the same.
Fig. 5 is a front elevation of a graduated stop dial constituting another device of my invention.

The tie rod 23 is also employed, as best shown in Fig. 4 for retaining a cylindrical casing 36 against the plate 11, and said casing has a cover plate 37 suitably fastened, as at 38 to the plate 11 in spaced relation thereto, said cover plate extending uwardly in front of the large gear wheel 15 so as to impart a finish to this part of the device.

The casing 36 has an opening 39 through which extends a cable or flexible member 40 having one end thereof attached to and wound on the drum 28, said cable occupying the grooves in the rim 29 of said drum. The cable extends downwardly under a rotatable sheave or guide 41 on the side of the front section 2, adjacent the camera bed 1, and then rearwardly to the rear section 3 where it is attached to said rear section, as at 42.

Besides the scale 17 the card 18 is provided with another scale 43 in the form of columns of figures relating to stops for certain exposures and all of the scales on this particular card will have special reference to a screen ruling and a separation distance, both of which vill be noted on the card, so that the card will be properly identified for a specific use. Other screen rulings and separation distances have other cards which can be maintained in an index system so that an operator can easily find a card for a specific use.

In connection with the mechanical elements referred to, there are four facts to be considered in connection with my method, namely, the transparent screen opening, the bellows extension, the screen distance or separation, and the size of the stop. It has been found that the dot formation is controlled by a ratio, wherein the camera extension is to the size of the stop as the screen distance is to the size of the screen opening, and in carrying out this equation, I find it convenient to reduce all measurements to the thousandths of an inch.

The first factor that I determine is the separation distance of the screen, and this is accomplished by squaring the screen opening and dividing the area by two; this gives the distance in thousandths of an inch that the screen ruling must be separated from the plate. The next step is to determine each camera extension division to balance stops on the lens scale, each of which is .050 larger in diameter than the preceding one. To determine the bellows extension markings:—first find how many times the screen opening is the distance of the separation. An example for 133 line screen is as follows: 1.000 divided by 133 equals .07511 the width of a screen unit, that is, from the center of one opaque line to the center of an adjacent line. The area of the unit would be the square of the width or .564. Mutiplying this by .50 equals .282, which is the screen separation. The width of the screen unit being .07511 it is divided by 2 to give the screen opening, which is .03755. Mutiplying this by 50 equals .187750 and dividing it by the screen separation .282 it equals .6656 which is the lens stop.

The above example shows that the detail stop is .050 of an inch at number one on scale $F^{32}$, and it is necessary to use three supplementary stops for closing the high lights and building the density on both the high light and detail dots, and also to secure a dot in the deep blacks by the use of white paper covering the copy while a very small stop is used. This so called flashing stop is not contained in any diagram and this stop may be determined from a suitable instrument so that each corresponding number for this particular stop will be one fourth the diameter of the detail stop.

The method of finding the high light stop to balance the detail stop is to place the same number (1) as noted on line $F^{32}$, which is the basic detail line, on line $F^{16}$, so that it will be directly over stop number 2 on line $F^{32}$. This will give four times the area and therefore four times the speed to the same number when used on line $F^{16}$.

To find the intermediate stop, I place the same number, (1) on line $F^{22}$ at exactly one-half the area diameter between number 1 of $F^{32}$ and number 1 of $F^{16}$. All other divisions are placed on the scale so that the area balances between any two stops may be again divided in relation to the time so that their speed will be exactly one-half more than the adjacent line (below), thus enabling the operator to secure better control of the delicate tone values by having intermediate lines or sets of stops to work upon.

The apparatus having been properly adjusted the operator will proceed somewhat along the following lines to use the camera for reproduction work.

First, the screen 6 is placed in the camera and set at a proper distance, indicated on the card 18 which corresponds to the screen in use, this separation distance being from the ruled center of the screen 6 to the surface of the sensitive plate 5. The copy to be reproduced is placed on a copy board and focused to size. The number indicated by the finger 16 on the scale 17 is now noted and this number is the key number to be followed on the lens scale 10 in making an exposure. The operator now selects the time on the time scale 43, using the column of time exposure that he feels will give a proper exposure under a particular like condition. Two or three exposures will determine the proper column of time to use and after this time is ascertained the same column of time exposures will apply on any other screen when placed in proper position on the camera, it being understood that a proper time card is used for the particular screen. The operator first notes the number indicated by the finger 16 on the card 18 and sets the diaphragm pointer 9 to the indicated number on $F^{16}$ line of the stop of the lens scale 10. For instance, if 133 line screen is used, the screen separation will be .282 of an inch. If the number indicated by the finger 16 is 8 and the time selected is column 3 on the time scale 43, the operator will set the diaphragm pointer 9 on 8 of $F^{16}$ line and give five seconds exposure. Next, the operator moves the pointer 9 to 8 on $F^{22}$ line and nineteen seconds exposure, and then to 8 on $F^{32}$ line, and gives one minute and sixteen seconds exposure. Next, the operator sets the flash stop to 8 and places a white piece of paper over the copy and exposes for two minutes and thirteen seconds. If this exposure is found to be correct he will use the column three times with any screen. If the copy is dark, exposures may be made on the $F^{19}$, $F^{27}$ and $F^{39}$ stop, and in extreme cases on the $F^{22}$, $F^{32}$ and $F^{45}$ stop. If the exposure is made starting on the $F^{19}$ stop the time will be one-half more than if the exposure is made on the $F^{16}$ stop, and then the operator will use column 5 on the time scale 43, as the stops used are one-half slower. If he start the exposure on $F^{22}$ line, he will use column 8 on the scale 43 as the stops are twice as slow.

There is still another method that may be followed in which the same time column may be used, and that is, to take time from one stop and carry to the other, properly dividing or multiplying the time to meet the requirements of the copy. As each stop in any series is double the speed of the next one below in the same series, any time taken from the large stop and carried to a smaller stop must be multiplied by two before adding to the next smaller stop, and any time taken from a small stop in a series must be divided by two before adding the next larger stop in the series.

What I claim is:—

1. The method of ascertaining the combination of stops for the production of half tone dot negatives, by a plurality of exposures in a camera having a lined screen and adapted to have a sensitized plate placed in the rear thereof, a lens movable to and from the screen, an automatic measuring instrumentality between the lens and screen, an adjustable disphragm for the lens, a diaphragm stop scale adjacent said diaphragm, and an interchangeable time exposure scale adjacent said measuring instrumentality, which method consists in first selecting and placing in position a time exposure scale for the particular lined screen in the camera; second, focusing a copy to size to actuate the measuring instrumentality; third, setting the adjustable diaphragm according to the measuring instrumentality on the first stop diaphragm scale; fourth, exposing the sensitized plate to the copy for the time elected on the time exposure scale for the first stop; fifth, adjusting the diaphragm for the second stop on the diaphragm scale; sixth, again exposing the sensitized plate for a time indicated on the time exposure scale for the second stop, and successively adjusting the diaphragm and making exposures for the predetermined stops and times exposures.

2. The method of ascertaining the combination of stops for the production of half tone dot negatives, by a plurality of exposures in a camera having a lined screen and adapted to have a sensitized plate placed in the rear thereof, a lens movable to and from the screen, an automatic measuring instrumentality between the lens and screen, an adjustable diaphragm for the lens, a diaphragm stop scale adjacent said diaphragm, and an interchangeable time exposure scale adjacent said measuring instrumentality, which method consists in first selecting and placing in position a time exposure scale for the particular lined screen in the camera which scale provides columns of time exposures for various stops; second, exposing the sensitized plate to copy to ascertain the column of time exposures to use for other stops; and, third, alternately adjusting the diaphragm and exposing the copy for the other stops.

3. A method as characterized in claim 2, wherein the adjustments for the diaphragm are governed by the measuring instrumentality indicating places on the diaphragm stop scale for each successive stop.

4. The method of ascertaining the combination of stops for the production of half tone dot negatives, by a plurality of exposures in a camera having a lined screen and adapted to have a sensitized plate placed in the rear thereof, a lens movable to and from the screen, an automatic measuring instrumentality between the lens and screen, an adjustable diaphragm for the lens, a diaphragm stop scale adjacent said diaphragm, and an interchangeable time exposure scale adjacent said measuring instrumentality, which method consists in utilizing the measuring instrumentality for indicating places on said diaphragm scale to which the diaphragm is set for different stops, and exposing the sensitized plate to copy between the diaphragm stop adjustments according to the time indicated on the time exposure scale for each stop.

5. The method of ascertaining the combination of stops for the production of half tone dot negatives, by a plurality of exposures in a camera having a lined screen and adapted to have a sensitized plate placed in the rear thereof, a lens movable to and from the screen, an automatic measuring instrumentality between the lens and screen, an adjustable diaphragm for the lens, and a diaphragm stop scale adjacent said diaphragm, which method consists in focusing a copy to size to actuate the measuring instrumentality; setting the adjustable diaphragm to the various places indicated on the diaphragm stop scale and determined by the measuring instrumentality for the various stops, and exposing the sensitized plate to copy between the various stops.

6. A method as characterized in claim 5, wherein the exposure time of the sensitized plate for the various stops are predetermined for different lined screens.

7. Means for ascertaining the combination of stops for the production of half tone dot negatives, by a plurality of exposures in a camera having a lined screen adapted to have a sensitized plate placed in the rear thereof, and an adjustable diaphragm, comprising a scale for the diaphragm, and a measuring instrumentality actuated by focusing the camera to indicate adjustments for the diaphragm relative to the scale thereof.

8. Means as characterized in claim 7, wherein said measuring instrumentality includes a scale, and a finger actuated by a take-up device.

9. Means as characterized in claim 7, wherein said measuring instrumentality includes a finger adjusted by and in proportion to a focal adjustment of the camera.

10. Means for ascertaining the combination of stops for the production of half tone dot negatives, by a plurality of exposures in a camera having a lined screen, adapted to have a sensitized plate placed in the rear thereof, and an adjustable diaphragm, comprising interchangeable time exposure cards mounted on the front of the camera and each having time exposure indicia for a particular lined screen in the camera and a scale pertaining to diaphragm stops, and a measuring instrumentality actuated by focusing said camera adapted to indicate on the scale the adjustment for the diaphragm.

11. Means as characterized in claim 10, wherein an additional scale adjacent the diaphragm cooperates with the card scale, in determining different adjustments for the diaphragm based on the card scale.

12. Means as characterized in claim 10, wherein said measuring instrumentality includes a take-up connection between the ends of the camera and a finger actuated thereby.

In testimony whereof I affix my signature in the presence of two witnesses.

FLETCHER DOUTHITT.

Witnesses:
KARL H. BUTLER,
ANNA M. DORR.